United States Patent [19]

Rogers

[11] Patent Number: 5,348,464
[45] Date of Patent: Sep. 20, 1994

[54] PIVOTING BARREL INJECTION MOLDING MACHINE

[75] Inventor: James B. Rogers, Dublin, Ohio

[73] Assignee: PH Hydraulics, Inc., Columbus, Ohio

[21] Appl. No.: 61,432

[22] Filed: May 14, 1993

[51] Int. Cl.⁵ .............................................. B29C 45/18
[52] U.S. Cl. .................................. 425/190; 425/192 R; 425/569; 425/574
[58] Field of Search ............... 425/567, 569, 574, 550, 425/190, 192 R

[56] References Cited

U.S. PATENT DOCUMENTS

| | | | |
|---|---|---|---|
| 3,436,793 | 4/1969 | Trueblood . | |
| 3,981,655 | 9/1976 | Horbach | 425/190 |
| 4,076,475 | 2/1978 | Trueblood | 425/159 |
| 4,846,652 | 7/1989 | Hehl | 425/190 |
| 5,011,396 | 4/1991 | Cosman et al. | 425/190 |

FOREIGN PATENT DOCUMENTS 491945 7/1992 European Pat. Off. .
9101868 2/1991 World Int. Prop. O. .......... 425/569

*Primary Examiner*—Tim Heitbrink
*Attorney, Agent, or Firm*—Frank H. Foster

[57] ABSTRACT

An injection molding apparatus comprising two spaced, parallel lower guide rods mounted to an undercarriage. A ram carriage and a barrel carriage are slidingly mounted on the lower guide rods. A feedscrew ram extends from the ram carriage into a tunnel formed in the barrel carriage to inject plastic out of a nozzle attached to the end of the barrel farthest from the ram carriage, and into a mold. Two spaced, parallel upper guide rods extend from the barrel carriage to slidingly engage the ram carriage. A pair of hydraulic cylinders displace the ram carriage with respect to the barrel carriage. A third hydraulic cylinder displaces the barrel carriage with respect to the undercarriage. The undercarriage, pivotally mounted to a base, is pivoted by a screw jack which displaces the undercarriage about an arcuate path.

15 Claims, 3 Drawing Sheets

PIVOTING BARREL INJECTION MOLDING MACHINE

TECHNICAL FIELD

This invention relates broadly to the field of injection molding machines for injecting molten plastic into a mold. In particular the invention relates to a means for displacing an injecting nozzle of the injection molding machine to position it in engagement with a mold.

BACKGROUND ART

Conventional injection molding machines have an injection barrel, which is a cylindrical tube, through which molten plastic is forced into a mold. An auger is rotatably driven within a tunnel formed in the barrel, and is displaced longitudinally within the barrel like a ram to allow new injection material to be fed into the barrel. The rotation of the auger/ram conveys the molten plastic to the end of the barrel at which a nozzle is attached. In operation, the nozzle is engaged within a nozzle receiving concavity in a mold and the auger/ram is displaced longitudinally, forcing pressurized plastic into the mold through the nozzle.

Conventionally, the barrel is displaced horizontally and vertically to align the nozzle with the nozzle receiving concavity. The vertical displacement of the barrel aligns the nozzle at the correct height to insert it into the concavity of the mold. The horizontal displacement of the barrel moves the nozzle into engagement with the nozzle receiving concavity of the mold for injection, and then withdraws the nozzle from the concavity to permit opening of the mold for part removal and changing of the molds. This involves removing the mold into which the injection molding machine has injected plastic, and replacing it with a new, empty mold.

Conventional injection molding machines are slidably mounted on tracks to accommodate the horizontal motion of the barrel. The vertical movement of the injection molding machine is normally accomplished by a scissors jack type of mechanism which is manually actuated. One well known machine is mounted to a table having a pair of links pivotally mounted to each end of the table to form a parallelogram. Each link is also pivotally mounted to a base. The table is then pivoted about the links, forming a parallelogram that is made more upright and, in its highest position, becomes a rectangle. The injection molding machine has rotational and translational displacement with this link apparatus, performing both horizontal and vertical displacement.

A problem with conventional injection molding machines, and their means for displacing the barrel with respect to the mold, is the complexity of the apparatus and the time consumed in varying the position of the barrel with respect to the mold. Mold changing occurs frequently, and should be accomplished quickly and accurately.

Therefore, the need exists for an apparatus for displacing an injection molding machine to position its nozzle in the nozzle receiving concavity of a mold. The apparatus should be simple to operate and should align the nozzle quickly and accurately with the concavity of a mold.

It is desired that the apparatus position the nozzle into the concavity, and then be capable of doing numerous horizontal displacement operations to accomplish injection and withdrawal to allow positioning of another mold. The horizontal motion of withdrawing the nozzle from, and replacing the nozzle into, the concavity of each mold should not require vertical realignment when a mold with a concavity height similar to the previous mold concavity is encountered. When a mold with a concavity having a different vertical position is encountered, vertical realignment of the nozzle will desirably be quick and accurate.

BRIEF DISCLOSURE OF INVENTION

The injection molding apparatus comprises an undercarriage and at least two spaced, parallel, lower guide rods or gibs mounted to the undercarriage. A barrel carriage is slidably mounted on the lower guide rods. The barrel carriage has a cylindrical barrel mounted to it, and the barrel has a plastic extrusion tunnel formed through its length. A ram carriage is slidably mounted on the lower guide rods or gibs. A cylindrical feedscrew ram is mounted to the ram carriage, and extends into the tunnel of the barrel. At least two spaced, parallel, upper guide rods are mounted to both the ram and the barrel carriage, slidably mounted to at least one of the carriages. At least one ram linear actuator is attached to both the ram and barrel carriages for displacing one carriage with respect to the other. At least one barrel linear actuator is attached to the barrel carriage and the undercarriage. The barrel linear actuator is for displacing the barrel carriage with respect to the undercarriage.

The undercarriage is pivotally mounted to a base by a hinge. An actuator is mounted to the undercarriage and the base pivots the undercarriage about the hinge, forcing the end of the barrel near the mold through an arcuate path. The actuator pivoting the undercarriage is to position the end of the barrel in alignment with an inlet opening on the mold.

Figure 1:
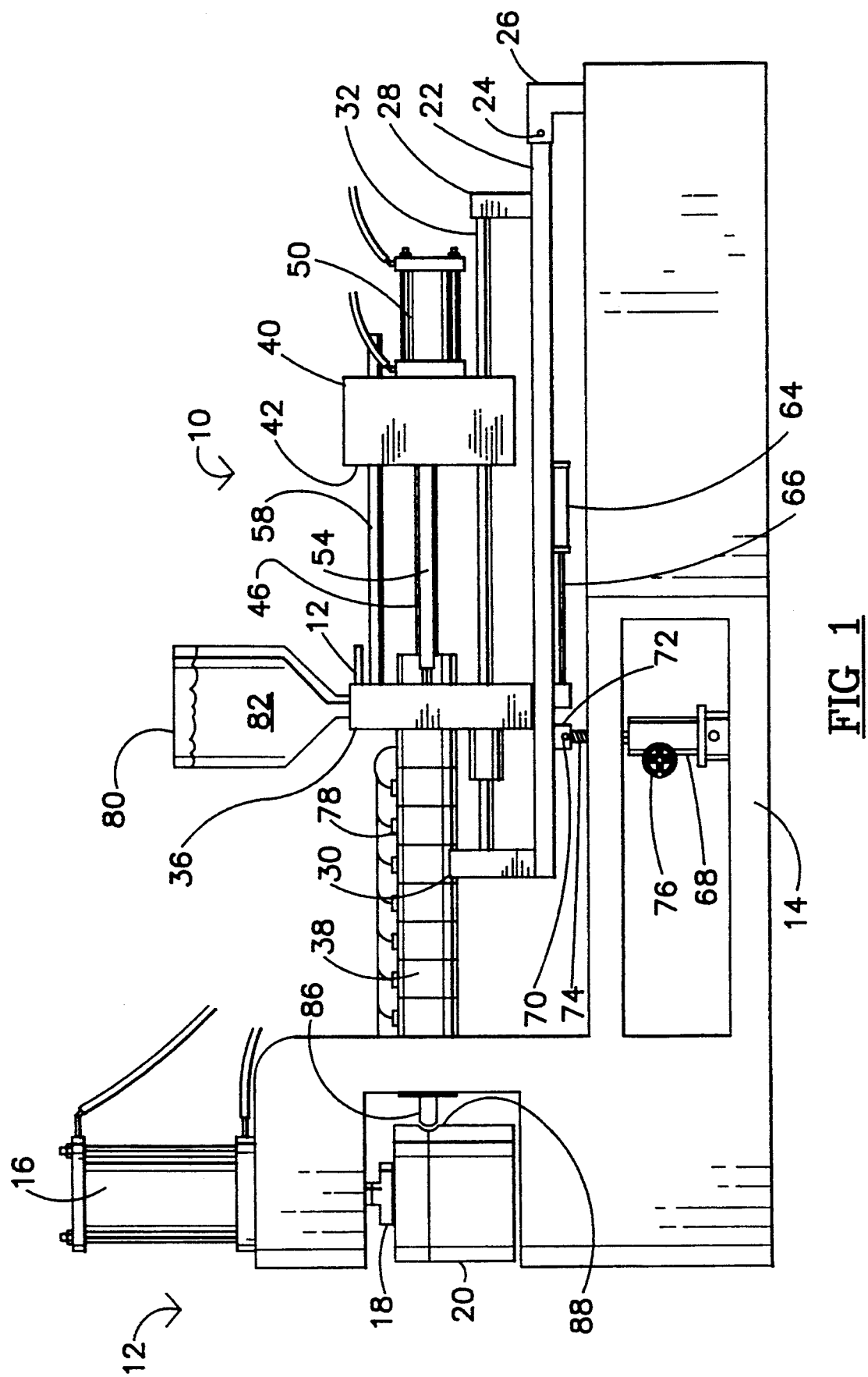
FIG. 1 is a side view illustrating the preferred embodiment of the present invention.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION

Figure 2:
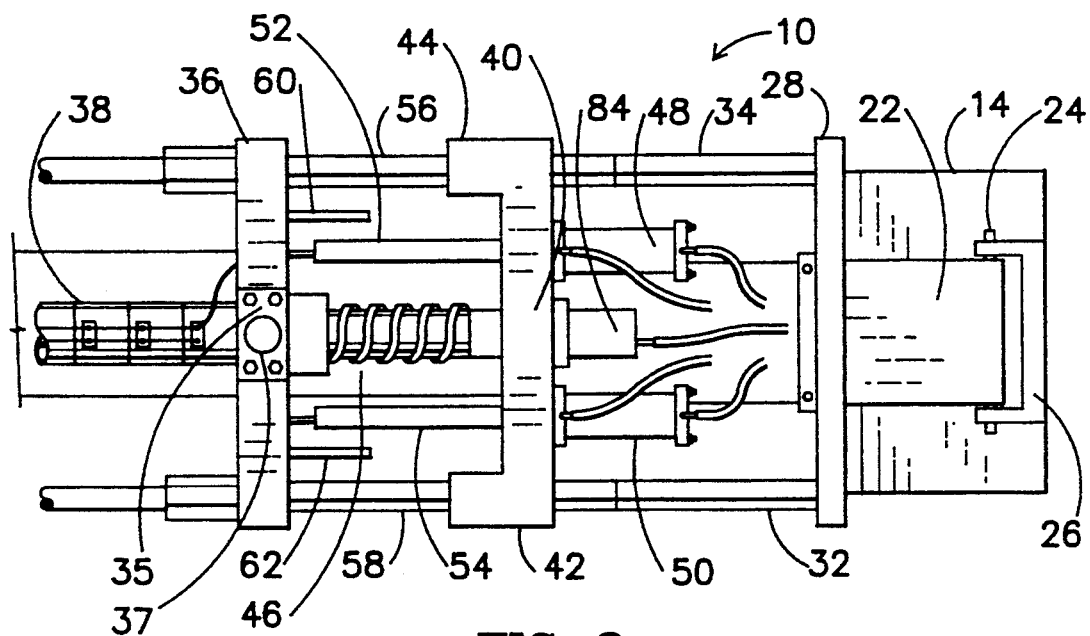
FIG. 2 is a top view illustrating a portion of the apparatus illustrated in FIG. 1.

Referring to FIGS. 1 and 2, a preferred injection molding apparatus 10 is shown connected to a mold press 12. The mold press 12 includes a base 14 to which a conventional hydraulic cylinder 16 is rigidly mounted. A hydraulic piston 19 with its upper end inserted within the hydraulic cylinder 16 is displaced vertically in the conventional manner to open, close and clamp two halves of a mold 20.

An undercarriage 22 is hingedly mounted to the base 14 by a pin 24 which extends through a hole in an arm 26 which is rigidly mounted to the base 14. The pin also extends through a corresponding hole formed laterally through one end of the undercarriage 22. Two ears 28 and 30 are rigidly fastened to, and near opposite ends of, the undercarriage 22. Two parallel, spaced, lower guide rods 32 and 34 are rigidly fastened to the ears 28 and 30, extending from one ear 28 to the other ear 30, aligned generally parallel to the undercarriage 22.

A block shaped, preferably steel plate forming a barrel carriage 36, has two oppositely facing sides which are larger than the other four, and is slidably mounted on the lower guide rods 32 and 34. The lower guide rods 32 and 34 extend slidably through the lower region of the barrel carriage 36 and are perpendicular to the barrel carriage 36. A tubular barrel 38, having a plastic extruding tunnel formed through it, is preferably rigidly mounted at one end to the barrel carriage 36. The barrel 38 extends generally parallel to the lower guide rods 32 and 34 and perpendicular to the barrel carriage 36.

A ram carriage 40 is a block shaped, preferably steel plate, with approximately the same dimensions as the barrel carriage 36, but having a pair of legs 42 and 44 rigidly mounted to opposite lateral sides and extending toward the barrel carriage 36. The lower guide rods 32 and 34 extend slidably through the lower region of the legs 42 and 44 of the ram carriage 40. A feedscrew ram 46, which is a rod having a helical fin extending longitudinally along the length of the rod to form an auger, extends from the ram carriage 40 slidingly into the tunnel of the barrel 38. The ram 46, when rotated, conveys material through the tunnel of the barrel 38. The ram 46 is also displaced longitudinally, as a piston, to pressurize material within the tunnel of the barrel 38 for extruding it out of the barrel 38.

Two linear actuators, which are preferably conventional hydraulic cylinders 48 and 50, are rigidly mounted to the side of the ram carriage 40 which faces away from the barrel carriage 36. The hydraulic cylinders 48 and 50 preferably can be actuated in the conventional manner along their axes, for forcibly extending and withdrawing a corresponding pair of connecting rods 52 and 54. The connecting rods 52 and 54 extend from within the hydraulic cylinders 48 and 50 slidably through the middle region of the ram carriage 40, and are rigidly fastened to the barrel carriage 36. Within the hydraulic cylinders 48 and 50, the connecting rods 52 and 54 are attached to conventional hydraulic pistons (not visible in FIG. 1 or 2).

Two parallel, spaced, cylindrical upper guide rods 56 and 58 extend from rigid attachment to the barrel carriage 36 to slidingly extend through the upper region of the legs 42 and 44 of the ram carriage 40. The preferred mounting of the upper guide rods 56 and 58 is not the only possible mounting arrangement. The guide rods 56 and 58 could equivalently be rigidly mounted to the ram carriage 40 and slidingly mounted to the barrel carriage 46. Additionally, the upper guide rods 56 and 58 could be slidably mounted to both the ram carriage 40 and the barrel carriage 36 with limiters placed on them to limit the distance they can slidably extend through either of the carriages to prevent them from sliding out of one of the carriages.

Each element of each pair of upper guide rods 56 and 58, lower guide rods 32 and 34, and hydraulic cylinders 48 and 50 is preferably spaced from the ram 46 the same distance as the other element in each pair.

Two stops 60 and 62, which are preferably cylindrical rods, are rigidly mounted at one of their ends to the side of the barrel carriage 36 that faces the ram carriage 40. The unattached ends of the stops 60 and 62 face the ram carriage 40 and the axes of the stops 60 and 62 are generally parallel to the lower guide rods 32 and 34. The stops 60 and 62 will seat against the legs 42 and 44 of the ram carriage 40 and prevent them from contacting the barrel carriage 36 if the ram carriage 40 is displaced too far toward the barrel carriage 36. The stops 60 and 62 could equivalently be rigidly mounted on the ram carriage 40, facing the barrel carriage 36.

A linear actuator, which is preferably a hydraulic cylinder 64, is rigidly mounted to the undercarriage 22. A connecting rod 66 extends slidingly from attachment to a hydraulic piston (not visible) within the hydraulic cylinder 64 in the conventional manner, and is attached to the barrel carriage 36. The hydraulic cylinder 64 displaces the barrel carriage 36 along the lower guide rods 32 and 34.

An actuator, which is preferably a conventional screw jack 68, is positioned beneath the undercarriage 22 and pivotally attaches to the undercarriage 22. A pin 70 extends through a hole formed in a boss 72, which extends downwardly from the undercarriage 22. The pin 70 extends through a corresponding hole formed through a threaded shaft 74 of the screw jack 68. The bottom of the screw jack 68 is preferably pivotally attached to the base 14 in the same way that the shaft 74 is attached to the undercarriage 22. By rotating a hand wheel 76, the threaded shaft 74 is displaced vertically in the conventional manner. The vertical displacement of the threaded shaft 74 pivots the undercarriage 22 about the pin 24 along an arcuate path. Of course, the manually operable jack system may alternatively be electrically or hydraulically powered.

A plurality of cylindrical, collar-like heaters 78 are placed circumferentially around the outer surface of the barrel 38. These heaters 78 heat and liquify preferred thermoplastic granules 82 that are gravity fed into the barrel 38 from a container, which is preferably a hopper 80. Other materials such as ceramic, rubber or powdered metal may also be used. A hydraulic motor 84, rigidly fastened to the side of the ram carriage 40 that faces away from the barrel carriage 36, rotatingly drives the ram 46.

Figure 4:
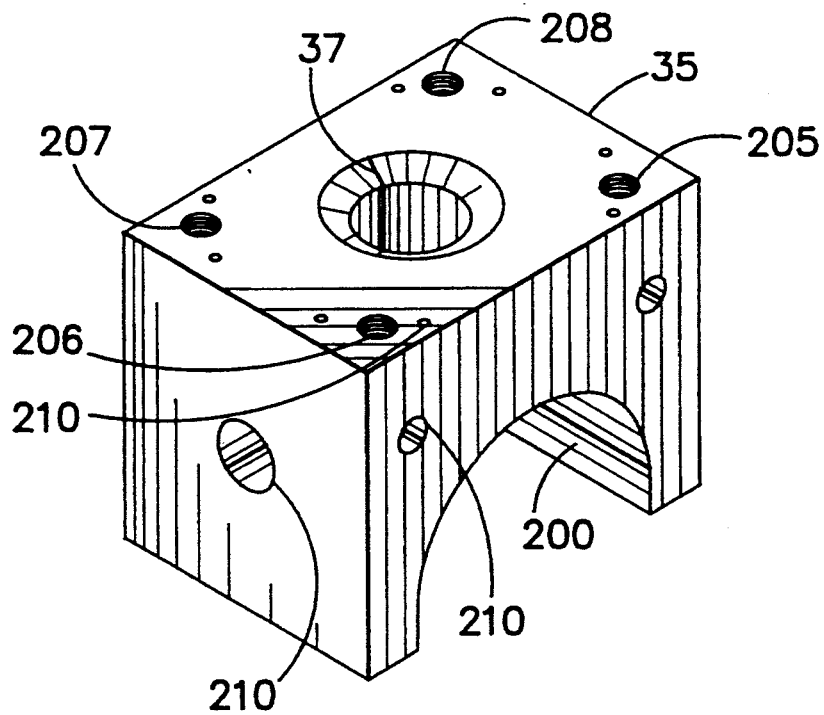
FIG. 4 is a view in perspective illustrating a feedthroat yoke.

In order to permit the convenient removal and replacement of the barrel 38 and to accommodate other materials which may have different melting temperatures and flow characteristics by allowing different hoppers and material feeding passageways to connect the hopper to the barrel 38, a removable feedthroat yoke 35 is provided. FIG. 4 shows the feedthroat yoke 35 which permits the preferred embodiment to be altered for use with different materials and facilitates barrel removal.

Figure 5:
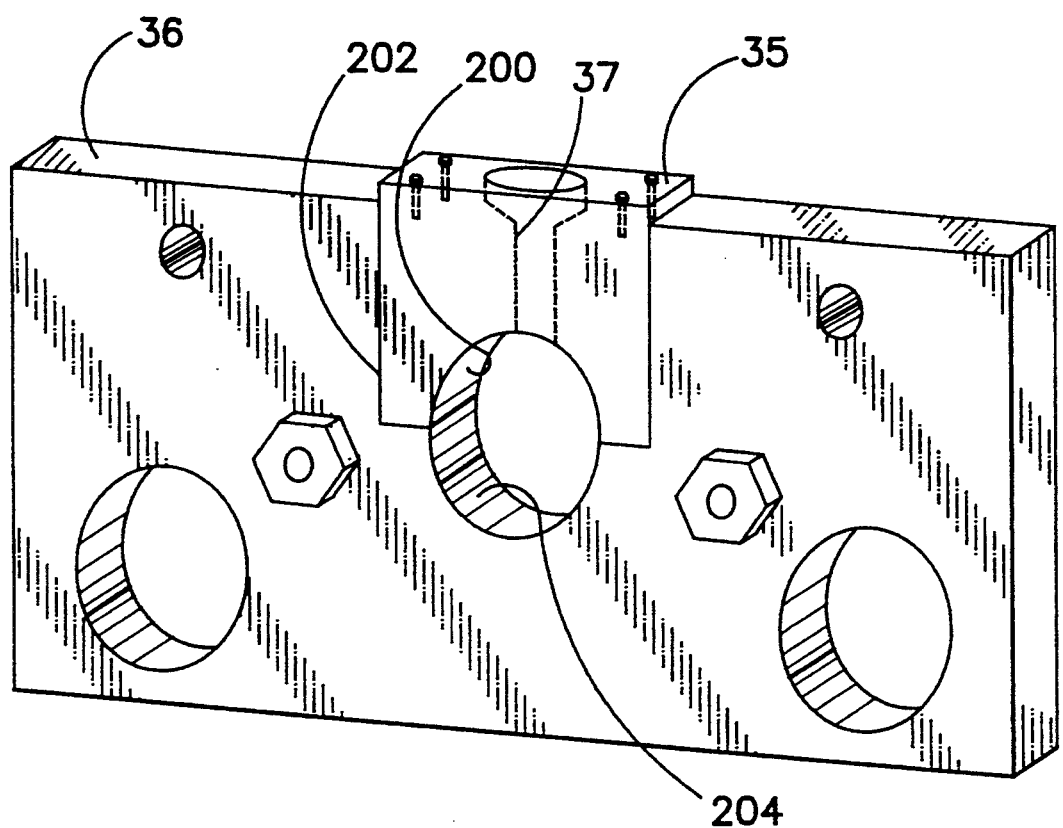
FIG. 5 is a view in perspective illustrating the feedthroat yoke mounted to the barrel carriage.

The yoke 35 is a preferably steel body having a semi-cylindrical channel 200 formed in a bottom surface (in its preferred, operable orientation shown in FIG. 4) and having a feedthroat passageway 37 extending from the top of the body, through to an opening in the channel 200. The yoke 35 is preferably mounted in a slot 202 formed in the barrel carriage 36 shown in FIG. 5. The slot 202 has an oppositely oriented but similarly sized, semi-cylindrical channel 204 formed in its bottom surface. The two channels semi-cylindrical 200 and 204 form a cylindrical orifice in which the barrel 38 is mounted. The yoke 35 forms one-half of a clamp which matingly surrounds and is forced against the barrel 38 by tightening four conventional bolts which extend through four holes 205, 206, 207 and 208 formed through the yoke 35 and thread into corresponding holes formed in the barrel carriage 36. The clamping force of the yoke 35 clamps the barrel 38 against the channel 204, holding it by friction in the orifice formed by the channels 200 and 204.

When the barrel is mounted to the carriage 36, a material feed aperture in the barrel 38 aligns with the feedthroat passage 37, connecting the barrel interior with a contiguous passage to the top of the yoke 35. A hopper 80 is preferably attached to the yoke 35, allowing the contents of the hopper 80 to flow by gravity through the feedthroat passage 37 and into the barrel 38.

The feedthroat passage 37 opening on the surface of the yoke 35 opposite the channel 200 is preferably beveled to more easily accommodate the attachment of the hopper 80.

Another feedthroat yoke can be installed in place of the existing one by merely unbolting and removing the existing yoke 35 and bolting a new one in its place. This may be done for maintenance purposes, or more advantageously, for installing a feedthroat yoke with a differently sized feedthroat passage. Different materials may require different feedthroat passage sizes, and therefore versatility is enhanced with an easily removable and replaceable yoke.

The removal of the barrel 38 is made easier with the yoke mounting apparatus since the barrel is merely clamped into place, instead of welded or threaded as is conventionally done. This clamping reduces the likelihood of a barrel freezing in place due to corrosion or extreme temperatures.

A plurality of cooling passages 210 are formed through the yoke 35, to cool the yoke 35 so the heat of the barrel 38 doesn't get conducted into the yoke 35 or hopper 80, melting the material in the feedthroat passage 37, causing the feedthroat to become restricted. Since the yoke 35 is removable, the cooling passages become accessible so they can be cleaned, thereby maintaining maximum heat removal.

A nozzle 86 having a convex outer surface, at least a portion of which is spherical, is fastened to the end of the barrel 38 farthest from the barrel carriage 36. A passage extends through the spherical nozzle 86 through which pressurized plastic within the barrel 38 is injected into the mold 20. The mold 20 has a nozzle receiving concavity 88 which is an inlet opening of the mold 20 and is attached by passageways to the mold cavity. The nozzle 86 is inserted into the concavity 88, sealingly engaging the outer surface of the nozzle 86 against the inner surface of the concavity 88.

The hinged connection between the undercarriage 22 and an arm 26 extending from the base 14 is preferred to have the orientation shown in FIG. 1 and FIG. 2. However, it is possible to position a hinged connection between the undercarriage 22 and the base 14 at other locations. Additionally, although it is preferred that the screw jack 68 is positioned between the hinged connection and the mold 20, it is possible to reverse their positions. The screw jack 68 could also be positioned on the opposite side of the mold 20 as it is in the preferred embodiment. However, the preferred embodiment, by placing the screw jack 68 between the mold 20 and the hinged connection, is the most effective in vertically displacing the nozzle 86 a specific distance for a given displacement of the shaft 71 of the screw jack 68.

A hydraulic cylinder, a scissor jack, or even a simple lever actuated by a worker or some other actuator could be substituted in place of the preferred screw jack 68 and would be equivalent. The hydraulic cylinders 48, 50 and 64 could equivalently have other linear actuators, such as screw jacks or electric motor and pulley assemblies, substituted for them.

The preferred embodiment of the present invention operates in the following manner referring to FIGS. 1 and 2. A mold 20 is placed on the base 14 and the hydraulic cylinder 16 compresses the two pieces of the mold 20, clamping them together. The threaded shaft 74 of the screw jack 68 is vertically displaced by rotating the hand wheel 76. This vertically displaces the injection molding apparatus 10, and more specifically, the nozzle 86, to position the nozzle 86 in vertical alignment with the nozzle receiving concavity 88. The hydraulic cylinder 64 is actuated to horizontally displace the injection molding apparatus 10, and more specifically, horizontally position the nozzle 86 within the nozzle receiving concavity 88. The outer surface of the nozzle 86 sealingly seats against the surface of the nozzle receiving concavity 88.

By forcing hydraulic fluid into one end of each of the hydraulic cylinders 48 and 50 the ram carriage 40 is displaced away from the barrel carriage 36 along the lower guide rods 32 and 34. When the ram carriage 40 is displaced away from the barrel carriage 36, the ram 46 withdraws from the tunnel inside the barrel 38. Plastic granules 82 are gravity fed into the tunnel of the barrel 38. The hydraulic motor 84 rotates the ram 46 which conveys the plastic, which has been melted by the heaters 78, to the nozzle 86 end of the barrel 38. Hydraulic fluid is forced into the opposite ends of the hydraulic cylinders 48 and 60 forcing the ram carriage 40 toward the barrel carriage 36. This motion of the ram carriage 40 forces the ram 46 deeper into the barrel 38 like a piston. The pressure generated by forcing the ram 46 into the tunnel of the barrel 38 extrudes the molten plastic out of the nozzle 86 and into the mold 20.

Once the mold 20 has been filled, the hydraulic motor 84 is actuated to withdraw the nozzle 86 away from the concavity 88 in the mold 20 to allow the mold 20 to be moved away once the press releases it. Additionally, the hydraulic cylinders 48 and 50 withdraw the ram 46 from inside the barrel 38 and the motor 84 rotates the ram 46 to allow more plastic granules 82 to be gravity fed into the barrel 38 and conveyed to the nozzle 86 end of the barrel 38 by the screw action of the feed screw ram 46.

Next, a new mold is positioned on the base 14 where the mold 20 was. If the height of the nozzle receiving concavity in the new mold is identical to that of the previous mold 20, the screw jack 68 is not operated to displace the nozzle 86 vertically. The hydraulic cylinder 64 displaces the nozzle 86 to position it in the new mold. If the height of the concavity in the new mold differs from the previous mold 20, the screw jack 68 is used to raise or lower the nozzle 86, aligning it with the concavity.

Figure 3:
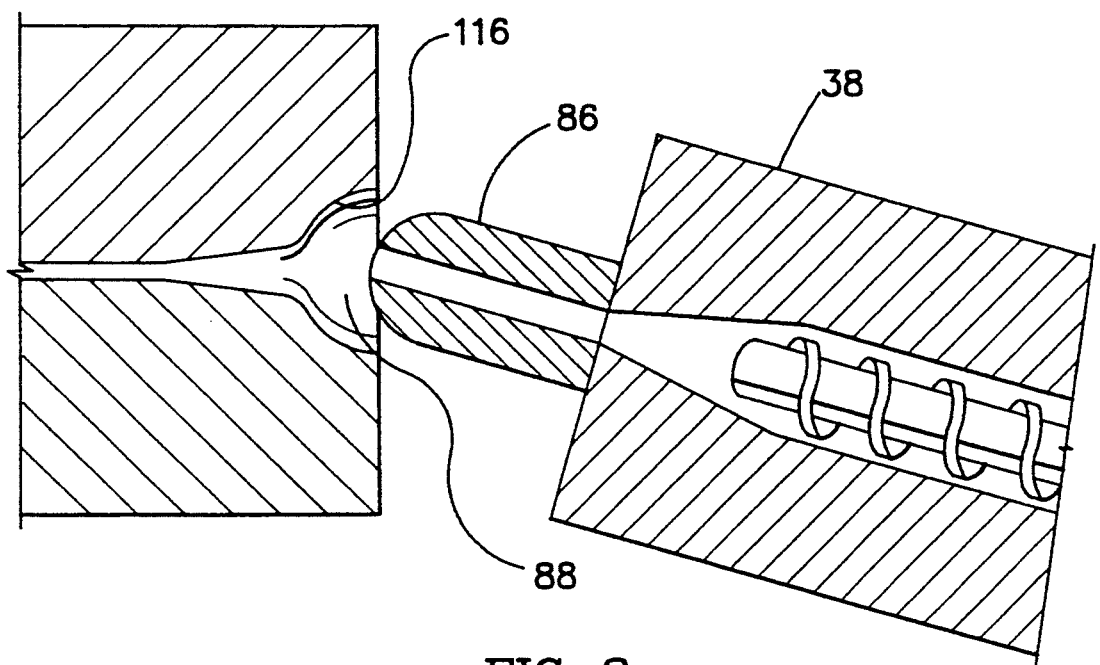
FIG. 3 is a side view in section illustrating the alignment of the nozzle and nozzle receiving concavity.

FIG. 3 shows more detail of the nozzle 86 end of the barrel 38 and the mold 20 shown in FIG. 1. The barrel 38 is positioned near the mold 20 and the nozzle receiving concavity 88 having a concavity surface 116, is formed in one side of the mold 20. The nozzle 86, which is attached to the barrel 38, is inserted into the mold 20, seating sealingly against the concavity surface 116 as described above.

The present invention is designed to permit the nozzle 86 to be sealingly inserted into the concavity 88, seating against the concavity surface 116, even when the axis of the barrel 38 is at an angle with respect to the facing surface of the mold 20. Because of the spherical curvature of the outer surface of the nozzle 86, some angular misalignment between the axis of the barrel 38 and horizontal can exist while still causing the outer surface of the nozzle 86 to sealingly engage the concavity surface 116. Injection of molding material into the mold 20 occurs with negligible hinderance due to the misalignment.

Two significant advantages exist with the present invention. A first advantage is that both the ram carriage 40 and the barrel carriage 36 are mounted on the lower guide rods 32 and 34. This allows one centrally located actuator, the hydraulic cylinder 64, to horizontally displace the entire injection molding apparatus 10. Since the barrel carriage 36 is effectively rigidly attached to the ram carriage 40 when the hydraulic cylinders 48 and 50 are not being actuated, horizontal displacement of the barrel carriage 36 with respect to the undercarriage 22 results in equal displacement of the ram carriage 40 with respect to the undercarriage 22. This aids in positioning of the ram carriage 40 and barrel carriage 36 with respect to the undercarriage 22, permitting quick and simple horizontal displacement and positioning of the injection molding apparatus 10.

The second advantage of the present invention is the ability of the entire injection molding apparatus 10 to be pivoted about an arcuate path. This permits quick vertical alignment of the nozzle 86 with the nozzle receiving concavity 88 in the mold 20. Rather than the complex horizontal and vertical displacement apparatus conventionally used, a simple pivot and screw jack accomplish the vertical positioning of the injection molding apparatus 10. Then, for each change of molds with concavities having similar heights as the previous mold, the only displacement of the injection molding apparatus 10 necessary, is horizontal, which is accomplished by a single, hydraulic cylinder 64.

While certain preferred embodiments of the present invention have been disclosed in detail, it is to be understood that various modifications may be adopted without departing from the spirit of the invention or scope of the following claims.

I claim:

1. An injection molding apparatus, comprising:
   a) an undercarriage;
   b) at least two spaced, parallel lower guide rods mounted to the undercarriage;
   c) a barrel carriage which is slidably mounted on the lower guide rods, and to which a cylindrical barrel having a plastic extrusion tunnel formed through its length is mounted;
   d) a ram carriage which is slidably mounted on the lower guide rods, and to which a cylindrical feedscrew ram is mounted extending into the tunnel of the barrel;
   e) at least two spaced, parallel upper guide rods, mounted to both the ram and barrel carriages, slidably mounted to at least one of the carriages;
   f) at least one ram linear actuator attached to both the ram and barrel carriages for displacing one carriage with respect to the other; and
   g) at least one barrel linear actuator, attached to the barrel carriage and the undercarriage for displacing the barrel carriage with respect to the undercarriage.

2. An injection molding apparatus in accordance with claim 1 wherein the apparatus comprises exactly one pair of lower guide rods, one pair of upper guide rods, one pair of ram linear actuators and one barrel linear actuator, wherein one element of each pair is positioned on opposite sides of, and equal distance from, the feedscrew ram as the second element of each pair.

3. An injection molding apparatus in accordance with claim 2 wherein the guide rods are cylindrical.

4. An injection molding apparatus in accordance with claim 3 wherein the upper guide rods are rigidly mounted to the barrel carriage and slidably mounted to the ram carriage.

5. An injection molding apparatus in accordance with claim 4 wherein the molding material is thermoplastic.

6. An injection molding apparatus in accordance with claim 5 wherein the injection molding apparatus further comprises a hydraulic press for opening, closing and clamping closed the mold.

7. An injection molding apparatus having a mold into which plastic is injected, comprising:
   a) a cylindrical barrel, having a plastic extrusion tunnel formed through its length, and having a convex nozzle, at least a portion of which is spherical, attached to an end of the barrel near the mold, through which plastic is forced and having a nozzle axis substantially co-linear with the barrel;
   b) an undercarriage, on which the barrel is slidably mounted;
   c) a hinge, pivotally attaching the undercarriage to a base;
   d) a concave mold inlet opening into the mold, at least a portion of the inlet being spherical and having an axis of symmetry for matingly engaging the convex nozzle to permit injection of plastic into the mold with the axis of the nozzle at an angle to the axis of the mold inlet;
   e) a first actuator for pivoting the undercarriage about the hinge, and forcing the end of the barrel near the mold through an arcuate path to position the nozzle in alignment with the inlet of the mold; and
   f) a second actuator for sliding the barrel with respect to the undercarriage along a path which is substantially parallel to the axis of the mold inlet to position the nozzle in engagement with the mold inlet.

8. An injection molding apparatus in accordance with claim 7 wherein the first actuator is positioned between the hinge pivotally attaching the undercarriage to the base and the end of the barrel near the mold.

9. An injection molding apparatus in accordance with claim 8 wherein the hinge is positioned at an end of the undercarriage farthest from the mold.

10. An injection molding apparatus in accordance with claim 9 wherein the first actuator comprises a screw jack.

11. An injection molding apparatus in accordance with claim 10 wherein the injection molding apparatus further comprises a hydraulic press for opening, closing and clamping closed the mold.

12. In an injection molding apparatus having a cylindrical injecting barrel and a carriage to which the barrel is mounted, an improved barrel mounting apparatus comprising:

(a) a removably mounted yoke, having a barrel receiving surface and a feedthroat passage extending through the yoke from the barrel receiving surface to another surface of the yoke; and (b) at least one fastener for attaching the yoke to the carriage, whereby the barrel is clamped between the yoke and the carriage.

13. An apparatus in accordance with claim 12 wherein the yoke attaches in a slot formed in the carriage.

14. An apparatus in accordance with claim 13 wherein the barrel receiving surface of the yoke is semi-cylindrical, a semi-cylindrical barrel receiving surface is formed in the slot in the carriage and the combination of the semi-cylindrical surfaces forms a cylindrical orifice in which the barrel is clamped.

15. An apparatus in accordance with claim 14 wherein cooling passages are formed through the yoke through which cooling fluid passes.

* * * * *